United States Patent
Bliss et al.

(10) Patent No.: US 7,302,613 B2
(45) Date of Patent: Nov. 27, 2007

(54) SYSTEM AND METHOD FOR CAPTURING KERNEL-RESIDENT INFORMATION

(75) Inventors: Andrew L. Bliss, Redmond, WA (US); John D. Service, Monroe, WA (US); Narayanan Ganapathy, Redmond, WA (US); Neill M. Clift, Kirkland, WA (US); Yi Meng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 10/712,619

(22) Filed: Nov. 12, 2003

(65) Prior Publication Data

US 2005/0102578 A1    May 12, 2005

(51) Int. Cl.
   *G06F 11/00*    (2006.01)
(52) U.S. Cl. .......................................... 714/38; 714/37
(58) Field of Classification Search ................... 714/38
   See application file for complete search history.

(56) References Cited

U.S. PATENT DOCUMENTS

| | | | |
|---|---|---|---|
| 6,349,355 B1 * | 2/2002 | Draves et al. ................. | 711/6 |
| 6,430,707 B1 * | 8/2002 | Matthews et al. ............ | 714/37 |
| 6,601,188 B1 * | 7/2003 | Wilding ....................... | 714/15 |
| 6,681,348 B1 * | 1/2004 | Vachon ......................... | 714/45 |
| 6,732,138 B1 * | 5/2004 | Browning et al. ........... | 718/102 |
| 6,871,350 B2 * | 3/2005 | Wong et al. ................. | 719/323 |
| 7,028,056 B1 * | 4/2006 | Hendel et al. .............. | 707/202 |
| 7,028,229 B2 * | 4/2006 | McGuire et al. ............. | 714/57 |
| 7,107,497 B2 * | 9/2006 | McGuire et al. ............. | 714/48 |
| 7,117,501 B2 * | 10/2006 | Rosu et al. ................. | 719/310 |
| 2004/0098639 A1 * | 5/2004 | Liu ............................. | 714/35 |
| 2004/0216137 A1 * | 10/2004 | Warwick et al. ............ | 719/318 |
| 2006/0117325 A1 * | 6/2006 | Wieland et al. ............. | 719/321 |
| 2006/0150203 A1 * | 7/2006 | Bendapudi et al. ......... | 719/328 |
| 2006/0200701 A1 * | 9/2006 | Callender .................... | 714/38 |
| 2007/0016914 A1 * | 1/2007 | Yeap .......................... | 719/328 |
| 2007/0124729 A1 * | 5/2007 | Ko et al. .................... | 718/100 |
| 2007/0130569 A1 * | 6/2007 | Heffley et al. .............. | 718/108 |
| 2007/0198998 A1 * | 8/2007 | Chen et al. ................. | 719/328 |

* cited by examiner

*Primary Examiner*—Christopher McCarthy
(74) *Attorney, Agent, or Firm*—Christensen O'Connor Johnson Kindness PLLC

(57) ABSTRACT

A system, method and interface for consistently capturing kernel resident information are provided. An operating system architecture includes user mode modules and kernel mode applications. A user mode module initiates a kernel mode information request through an application program interface identifying one or more process threads of interest. A kernel mode module captures information corresponding to standard kernel mode information and corresponding to the specifically identified process threads. The information is returned in a pre-allocated buffer.

27 Claims, 5 Drawing Sheets

SYSTEM AND METHOD FOR CAPTURING KERNEL-RESIDENT INFORMATION

FIELD OF THE INVENTION

In general, the present application relates to computer software, and in particular, to a system and method for capturing kernel-resident information for troubleshooting.

BACKGROUND OF THE INVENTION

Generally described, a typical computer system architecture provides two primary modes for execution of software application instructions. The modes of execution are enforced by a processor when executing instructions sent by a software application. Generally described, the two modes correspond to a level of trust placed on the application by an operating system to ensure system stability and reliability. The first mode, typically referred to as the user mode, provides the lowest level of protection and corresponds to all external user modules and some operating system models functioning as utilities. The operating system classifies modules as user mode modules in an attempt to allow the operating system to continue to function even if a user mode module incurs an error. The second mode, referred to as the kernel mode, provides the highest level of protection and typically corresponds to core operating system application modules and driver modules that interact with the user mode modules. Unlike user mode modules, errors in a kernel mode module will typically result in the complete crash of the operating system.

In certain situations, errors can occur within user mode modules that prevent the application from running as desired. Additionally, in some instances, errors within kernel mode modules can prevent the operating system from running as desired. To improve application and operating system stability and reliability, it is often desirable to collect and process information corresponding to the user mode modules and/or kernel mode modules being implemented by a particular application prior to the occurrence of an error. Because user mode module errors do not always result in the crashing of the operating system, typical operating system utilities can collect and provide information regarding the state of the user mode module prior to the occurrence of the error. However, user mode module error information is limited in nature and cannot always accurately describe the nature of the error absent additional kernel mode module information. Accordingly, the ability to obtain as much information about the user mode modules and the kernel mode modules provides for improved error debugging.

Current kernel mode module information gathering techniques are either intrusive or destructive in nature. In one approach, a computing device may include a second processor that collects and provides kernel mode module data as the first processor executes the kernel mode module instructions. However, the utilization of a second processor for error checking is not practical for many users because it requires a redundant processor for error checking. Accordingly, the dedicated processor approach is not a feasible approach for continuously collecting error information from a large group of users.

Many operating systems have provide an operating system utility, referred to as a data dump, that captures information corresponding to the threads being executed just before the operating system crashes. Accordingly, in another approach to collecting kernel mode information, the user mode module can force the operating system to crash and invoke the data dump functionality. However, this approach is largely destructive by requiring the operating system to crash and requiring a user to reboot the operating system. Further, because the utility is limited to capturing information corresponding to current threads and cannot be directed to capture specific kernel mode data corresponding to the user mode module crash.

Thus, there is a need for a system and method for collecting kernel mode module data for application errors without requiring intrusive or destructive collection mechanisms.

SUMMARY OF THE INVENTION

A system, method and interface for consistently capturing kernel resident information are provided. An operating system architecture includes user mode modules and kernel mode modules. A user mode module initiates a kernel mode information request through an application program interface identifying one or more process threads of interest. A kernel mode module captures information corresponding to standard kernel mode information and corresponding to the specifically identified process threads. The information is returned in a pre-allocated buffer.

In accordance with an aspect of the present invention, a method for consistently collecting kernel information associated with the execution of a user mode module is provided. The method may be implemented in a computer system having an operating environment including user mode modules having a first level of protection and kernel mode modules having a second level of protection. In accordance with the method, a requestor application transmits a request to collect kernel mode module information. The request to collect kernel mode module information includes an identification of one or more process threads from which kernel mode information will be collected. A kernel mode module obtains the request to collect kernel mode module information and captures information corresponding to each thread identified in the request to collect kernel mode module information. The kernel mode module transmits a result of the capturing of the information corresponding to each thread identified in the request to collect kernel mode module information. The requester module obtains the result of the capturing of the information corresponding to each thread identified in the request to collect kernel mode module information.

In accordance with another aspect of the present invention, a method for consistently collecting kernel information associated with the execution of a user mode module is provided. The method may be implemented in a computer system having an operating environment including user mode modules having a first level of protection and kernel mode modules having a second level of protection. In accordance with the method, a kernel mode module obtains a user mode module request to collect kernel mode module information including an identification of one or more process threads from which kernel mode information will be collected. The kernel mode module captures information corresponding to each thread identified in the request to collect kernel mode module information. The kernel mode module then transmits the captured kernel mode module information.

In accordance with a further aspect of the present invention, a software architecture for consistently collecting information associated with the execution of a user mode module is provided. The software architecture is implemented in a computer system having an operating environment including user mode modules having a first level of protection and kernel mode modules having a second level of protection. The software architecture includes a processing component for capturing kernel mode module information corresponding to one or more processing threads identified in a request to collect kernel mode module information. Additionally, the software architecture includes at least one application program interface for accessing the processing component and identifying the one or more processing threads from which to collect kernel mode module information.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention corresponds to a system and method for capturing kernel-resident information without requiring an intrusive or destructive collection mechanism. More specifically, the present invention corresponds to a system and method identifying and capturing kernel-resident information including the capture of standard kernel resident information and information corresponding to specifically identified process threads. Although the present invention will be described with regard to an operating environment having two modes of module execution and specific interfaces, one skilled in the relevant art will appreciate the operating environment and interfaces are illustrative in nature and should not be construed as limiting.

Figure 1:
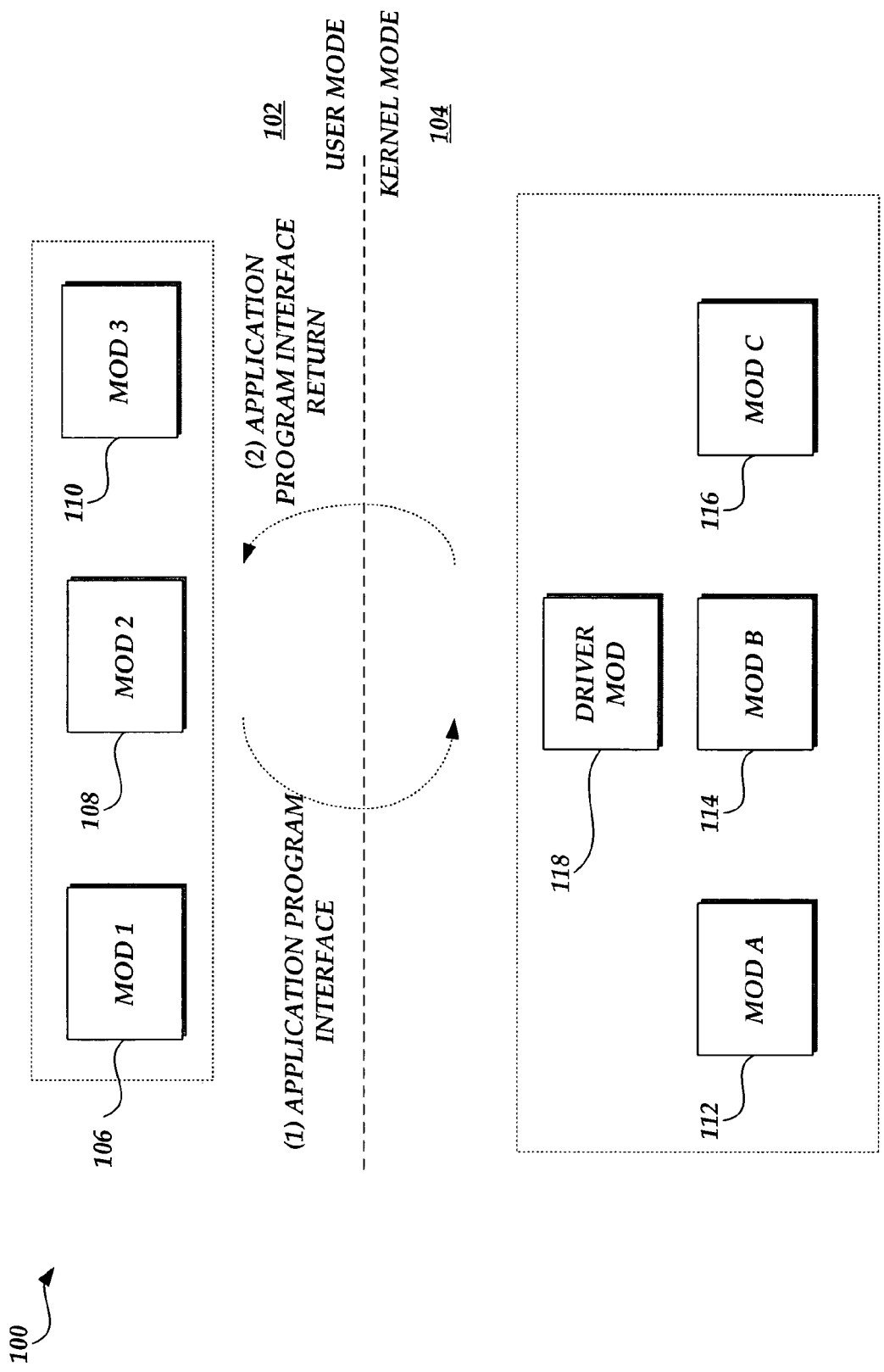
FIG. 1 is a block diagram illustrative of a computing operating environment defining two distinct levels of protection including a user mode and a kernel mode in accordance with the present invention.

FIG. 1 is a block diagram illustrative of an operating system architecture 100 including two primary modes of execution. The first mode of execution is a user mode 102 corresponding to a lower level of protection. The second mode of execution is a kernel mode 104 corresponding to higher level of protection. The utilization of two execution modes in an operating environment is well known in the relevant art and will not be described in greater. Further, although the operating environment 100 includes only two modes of execution, the operating environment can include additional modes of execution.

As illustrated in FIG. 1, the user mode 102 can include a number of user mode modules 106, 106, 110. The user mode modules can correspond some operating system applications as well as non-operating system applications. Similarly, the kernel mode 104 can include a number of kernel mode modules 112, 114, 116. In an illustrative embodiment of the present invention, software applications may be associated with one or more user mode modules and kernel mode modules that interact during execution of the software application. Because the user mode modules 106, 108, 110 are in the lowest mode of protection (e.g., user mode 102) they can only access core operating system functionality provided by the kernel mode modules 112, 114, 116 through interfaces generally referred to as application programming interfaces (APIs).

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software. One skilled in the relevant art will appreciate that there are a number of embodiments for implementing programming interfaces, all of which are considered to be within the scope of the present invention.

The APIs are issued by the application and processed by a special application referred to as a driver module 118. The driver module 118 can in turn invoke the functionality of kernel mode modules 112, 114, 116. In one embodiment, the functionality of the driver 118 may be a resident part of the operating environment. Alternatively, the driver 118 may be a non-operating system resident kernel module provided to interface with requesting user mode modules.

Figure 2:
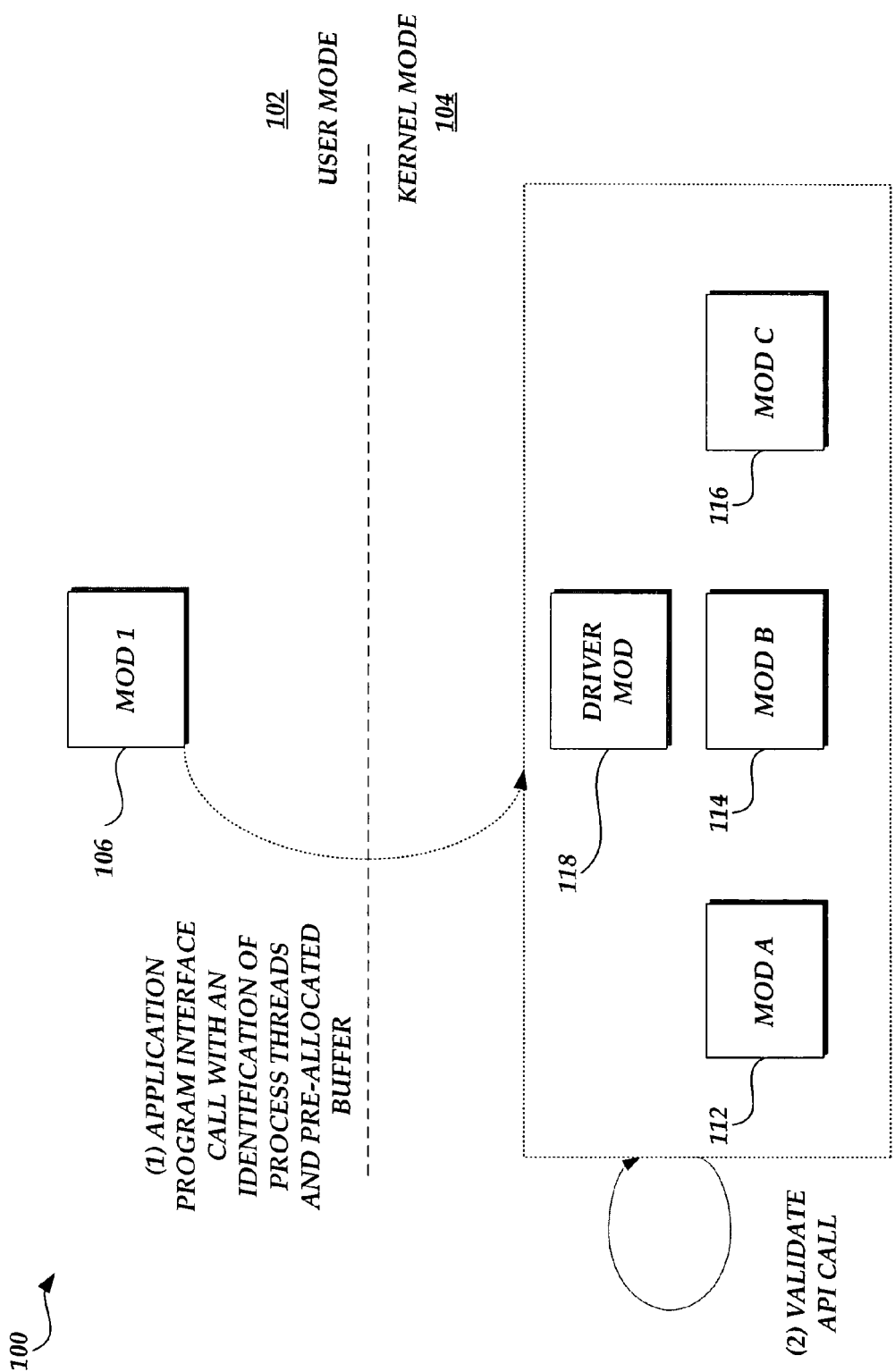
FIG. 2 is a block diagram of a computing operating environment including an user mode modules and a number of kernel mode modules and illustrating the initiation a kernel mode module information request by the user mode module.
Figure 3:
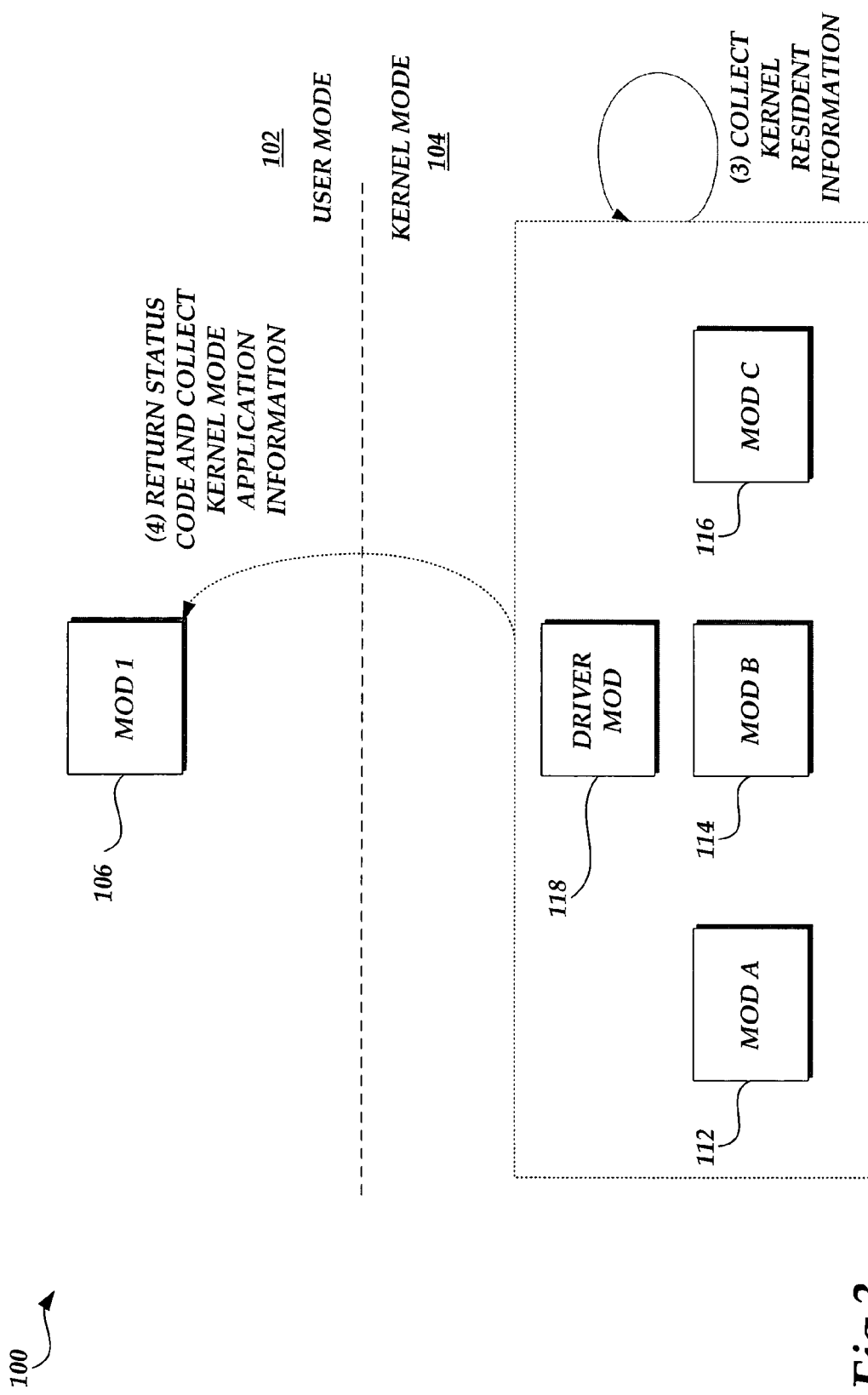
FIG. 3 is a block diagram of the computing operating environment of FIG. 2 illustrating the processing of the kernel mode module information request by the kernel mode modules.

With reference now to FIGS. 2-3, an embodiment for requesting kernel resident information will be described. FIG. 2 is a block diagram of the operating system architecture 100 of FIG. 1 illustrating the initiation of a request for kernel resident information by a user mode module 106. The user mode module 106 initiates the request by utilization an API corresponding to the request for kernel resident information. In an actual embodiment of the present invention, the user mode module passes a request to collect information corresponding to one or more process threads that are being executed by the kernel modules. Further, the API includes an identification of a pre-allocated buffer that will serve as the repository for the kernel resident information. Once the driver 118, or other operating system resident module, receives the user mode API request, the driver can validate the API to ensure that it is proper.

Assuming that the API has been properly configured, and with reference to FIG. 3, the driver 118 initiates the collection of kernel-resident information. In an illustrative embodiment of the present invention, the kernel-resident information captured can include information identifying loaded driver modules, which corresponds to standard kernel resident data dumps. Additionally, the kernel-resident information can include information regarding the state, or context of the identified threads, contents of the thread kernel stacks corresponding to the identified threads, and information regarding pending I/O requests corresponding to the identified threads. Further, in the illustrative embodiment of the present invention, the kernel-resident information is captured through asynchronously issued capture requests. Once the collection of the kernel-resident information is complete, the driver 118, or other operating-system resident module, returns a status code to the user mode module. Additionally, the collected kernel-resident information is returned in the pre-allocated memory identified by API. The kernel-resident information can then be processed along with any other information, such as the user mode module information.

Figure 4:
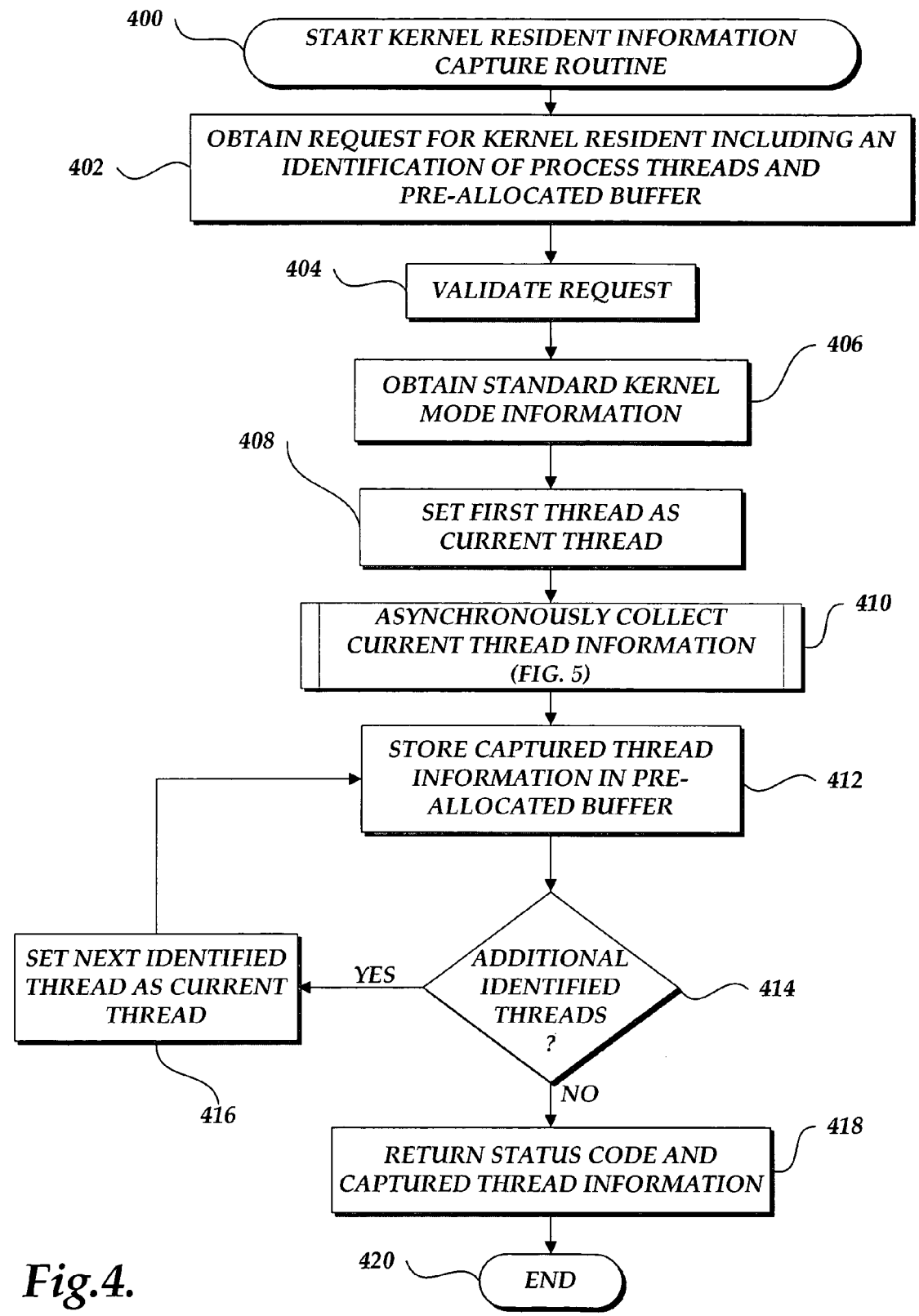
FIG. 4 is a flow diagram illustrative of a kernel mode module information capture routine implemented by a computing device in accordance with the present invention.

FIG. 4 is a flow diagram illustrative of a kernel mode information capture routine 400 implemented by kernel mode module in accordance with the present invention. At block 402, the kernel mode module obtains a request for kernel resident information. In an illustrative embodiment of the present invention, the request for kernel resident information is embodied in an API issued by a user mode module. The user mode module issuing the API may be a user mode module that has experienced an error, a user mode module that provides troubleshooting or debugging functionality or any other user mode module. Additionally, in an illustrative embodiment of the present invention, the API includes the identification of one or more process threads that are associated with a particular user mode module and that are being executed. The API also includes the identification of a pre-allocated memory buffer that will receive the kernel resident information. Although the initiation of a kernel-resident information request is described in response to a user mode module error, one skilled in the relevant art will appreciate the request may be initiated at any time, such as for performance monitoring or performance optimization.

At block 404, the kernel mode module validates the request. In an illustrative embodiment of the present invention, the kernel mode module may validate the form of the API. Further, the kernel mode module may verify that the identified threads are being executed and available for information polling or that the information is otherwise available. Assuming that the API request is validated, at block 406, the kernel mode module obtains standard kernel mode information. In an illustrative embodiment of the present invention, standard kernel mode information corresponds to information provided by operating system utilities regarding the current state of kernel mode modules. The standard kernel mode information can include an identification of all loaded driver modules, an identification of all pending process threads and the context for each pending process threads. However, one skilled in the relevant art will appreciate that the alternative or additional information may be included within the standard kernel mode information. The captured standard kernel mode information is stored in the pre-allocated buffer identified in the API request.

At block 406, an iterative process begins with the setting of the first process thread included in the API request as a current thread. At block 410, the kernel mode module asynchronously collects information corresponding to the current thread. At block 412, the kernel mode module stores the captured thread information in the pre-allocated buffer identified in the API request. A more detailed description of the capture of thread information will be described below. At decision block 414, a test is conducted to determine whether additional threads were identified in the API request and have not been processed. If additional identified threads have not been processed, at block 416, the kernel mode module sets the next identified thread as a current thread and the routine 400 returns to block 412. In an illustrative embodiment of the present invention, the asynchronous collection of the thread information allows the kernel mode module to continuously fire thread information requests without regard to whether the previous request has been fulfilled. Once all the identified threads have been processed, at block 418, the kernel mode module returns a status code to the requesting user mode module and the captured kernel mode information in the pre-allocated memory buffer. In an illustrative embodiment of the present invention, the status code can correspond to whether the kernel resident information capture was successful, such as a binary indicator. Additionally, the status code can also include additional processing information, such as performance statistics or an identification of any particular errors/problems. The routine 400 terminates at block 420.

Figure 5:
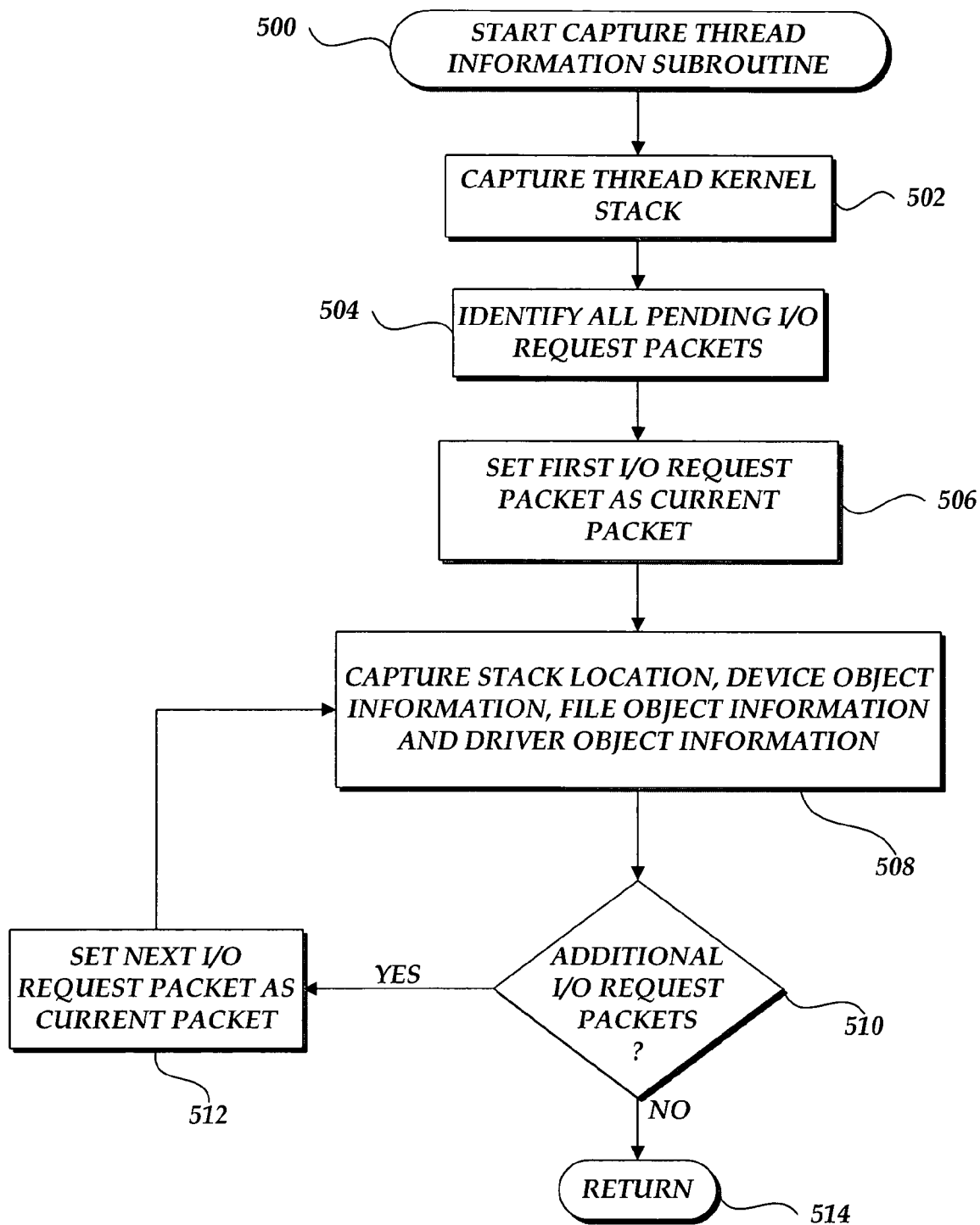
FIG. 5 is a flow diagram illustrative of thread information capturing sub-routine implemented by a computing device in accordance with the present invention.

With reference now to FIG. 5, a sub-routine 500 for capturing thread information corresponding to block 412 (FIG. 4) will be described. At block 502, the kernel mode module captures the stack for the currently identified process thread. The thread stack information can include status information, such as procedure and function calls, passed parameters, and local variable values. At block 504, the kernel mode module identifies all pending I/O request packets ("IRPs") that have been pended to the current process thread. One skilled in the relevant art will appreciate that a process thread can include one or more IRPs corresponding to I/O associated with the execution of the process thread.

At block 506, the sub-routine 500 enters into an iterative loop by designating the first identified IRP as a current IRP. At block 508, the kernel mode module captures a variety of information related specifically to the identified IRP. In an illustrative embodiment of the present invention, the IRP information can include an identification of the location of an IRP stack and device object information corresponding to an identification of a hardware device associated with the I/O request. The IRP information can also include file object information corresponding to an identification of a file manipulation command, such as an open file command or a read/write command, associated with the I/O request. Additionally, the IRP information can include driver object information corresponding to an identification of an application driver associated with the I/O request. The captured information is stored in the pre-allocated buffer identified in the API request. Although the collection of the IRP information is described with regard to specific information or types of information, one skilled in the relevant art will appreciate that additional or alternative IRP or thread information may also be collected as dictated by the information that is available and/or the information that is requested by the user mode module.

At decision block 510, a test is conducted to determine whether additional identified IRPs are to be processed. If additional identified IRPs remain unprocessed, at block 512, the next identified, unprocessed IRP is set as the current IRP and the sub-routine 500 returns to block 508. Once all the pending IRP information has been captured, the sub-routine 500 returns to routine 400 at block 514.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. In a computer system having an operating environment including user mode modules having a first level of protection and kernel mode modules having a second level of protection, a method for consistently collecting information associated with the execution of a user mode module, the method comprising:
   transmitting, by a requestor application, a request to collect kernel mode module information, wherein the request to collect kernel mode module information includes an identification of one or more executing process threads from which kernel mode information will be collected;
   obtaining, by a kernel mode module, corresponding to a driver application external to the operating system, the request to collect kernel mode module information;
   capturing, by the kernel mode module, information corresponding to each thread identified in the request to collect kernel mode module information;
   transmitting, by the kernel mode module, a result of the capturing of the information corresponding to each thread identified in the request to collect kernel mode module information; and
   receiving, by the requestor application, the result of the capturing of the information corresponding to each thread identified in the request to collect kernel mode module information.

2. The method as recited in claim 1, wherein the request to capture kernel mode module information includes an identification of a pre-allocated memory in which to store captured kernel mode information.

3. The method as recited in claim 1, wherein the kernel mode module is an operating system resident application.

4. The method as recited in claim 1 further comprising capturing, by the kernel mode module, a list of all loaded drivers.

5. The method as recited in claim 1, wherein capturing information corresponding to each thread identified in the request to collect kernel mode module information includes:
   (a) capturing a thread kernel stack; and
   (b) capturing all pending I/O request packet information; and
   (c) repeating (a)-(b) for each identified thread in the request to capture kernel mode module information.

6. The method as recited in claim 5, wherein capturing all pending I/O request packet information includes:
   (a) capturing an identification of all pending I/O request packets;
   (b) capturing current stack location for the identified I/O requests;
   (c) capturing device object information;
   (d) capturing file object information;
   (e) capturing driver object information; and
   (f) repeating (a)-(e) for each I/O request packet corresponding to a current thread.

7. The method as recited in claim 5, wherein capturing information corresponding to each thread identified in the request to collect kernel mode module information is asynchronous.

8. The method as recited in claim 1, wherein transmitting a result includes transmitting a status code corresponding to the success or failure of the information capture.

9. The method as recited in claim 1, wherein transmitting a result includes storing the captured kernel mode module information in an allocated memory.

10. The method as recited in claim 1, wherein transmitting a request to collect kernel mode module information occurs in response to a user mode module error.

11. The method as recited in claim 1, wherein transmitting the captured kernel mode module information includes transmitting a status code corresponding to the success or failure of the information capture.

12. A computer-readable medium having computer-executable instructions for performing the method recited in claim 1.

13. A computer system having a processor, a memory and an operating environment, the computer system for performing the method recited in claim 1.

14. In a computer system having an operating environment including user mode modules having a first level of protection and kernel mode modules having a second level of protection, a method for consistently collecting information associated with the execution of a user mode module, the method comprising:
   obtaining a user mode module request to collect kernel mode module information including an identification of one or more executing process threads from which kernel mode information will be collected;
   wherein obtaining a user mode module request includes obtaining, by a driver application external to the operating system, the user mode module request;
   capturing information corresponding to each thread identified in the request to collect kernel mode module information; and
   transmitting the captured kernel mode module information.

15. The method as recited in claim 14, wherein the request to capture kernel mode module information includes an identification of a pre-allocated memory in which to store captured kernel mode information.

16. The method as recited in claim 14, wherein obtaining a user mode module request includes obtaining, by an operating system resident application, the user mode module request.

17. The method as recited in claim 14 further comprising capturing a list of all loaded drivers.

18. The method as recited in claim 14, wherein capturing information corresponding to each thread identified in the request to collect kernel mode module information includes:
   (a) capturing a thread kernel stack; and
   (b) capturing all pending I/O request packet information; and
   (c) repeating (a)-(b) for each identified thread in the request to capture kernel mode module information.

19. The method as recited in claim 18, wherein capturing all pending I/O request packet information includes:
   (a) capturing an identification of all pending I/O request packets;
   (b) capturing current stack location for the identified I/O request;
   (c) capturing device object information;
   (d) capturing file object information;
   (e) capturing driver object information; and
   (f) repeating (a)-(e) for each I/O request packet corresponding to a current thread.

20. The method as recited in claim 18, wherein capturing information corresponding to each thread identified in the request to collect kernel mode module information is asynchronous.

21. A computer-readable medium having computer-executable instructions for performing the method recited in claim 14.

22. A computer system having a processor, a memory and an operating environment, the computer system for performing the method recited in claim 14.

23. A computer system having a processor, a memory, and an operating environment, the operating environment including user mode modules having a first level of protection and kernel mode applications having a second level of protection, the system comprising:
 a driver application comprising a processing component for capturing kernel mode module information corresponding to one or more executing processing threads identified in a request to collect kernel mode module information; and
 at least one application program interface for accessing the processing component and identifying the one or more executing processing threads from which to collect kernel mode module information: and
 wherein the kernel mode module information includes a thread kernel stack and all pending I/O request packet information for each identified process thread; and
 wherein all pending I/O request packet information includes an identification of the pending I/O request packet, a current stack location, device object information, file object information and driver object information for each identified I/O request packet corresponding to an identified process thread.

24. The system as recited in claim 23, wherein the at least one application program interface is further operable to identify a pre-allocated memory to received captured kernel mode module information.

25. The system as recited in claim 23, wherein the processing component is embodied as an operating system resident application.

26. The system as recited in claim 23, wherein the kernel mode module information includes a list of all loaded drivers.

27. The system as recited in claim 23, wherein the process component captures the kernel mode module information asynchronously.

* * * * *